United States Patent
Meiranke et al.

(10) Patent No.: US 11,273,914 B2
(45) Date of Patent: Mar. 15, 2022

(54) ASYMMETRICALLY RAISABLE CARGO LOADING PLATFORM, AND CARGO LOADING APPARATUS, CARGO CONTAINER AND AIRCRAFT WITH A CARGO LOADING PLATFORM

(71) Applicant: Airbus Operations GmbH, Hamburg (DE)

(72) Inventors: Dirk Meiranke, Hamburg (DE); Lars Uwe Hansen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 398 days.

(21) Appl. No.: 16/534,151

(22) Filed: Aug. 7, 2019

(65) Prior Publication Data

US 2020/0047869 A1 Feb. 13, 2020

(30) Foreign Application Priority Data

Aug. 9, 2018 (DE) .......................... 102018119396.3

(51) Int. Cl.
*B64D 9/00* (2006.01)
*B64C 1/14* (2006.01)
*B64C 1/22* (2006.01)

(52) U.S. Cl.
CPC .............. *B64D 9/00* (2013.01); *B64C 1/1415* (2013.01); *B64C 1/22* (2013.01)

(58) Field of Classification Search
CPC .................................. B64D 9/00; B64D 1/22
See application file for complete search history.

(56) References Cited

U.S. PATENT DOCUMENTS

| 3,464,713 A | 9/1969 | Davidson |
| 3,964,625 A | 6/1976 | Wirz |
| 4,131,251 A | 12/1978 | Lloyd et al. |

(Continued)

FOREIGN PATENT DOCUMENTS

| AU | 001963030662 B1 | 5/1963 |
| DE | 0243276 T1 | 2/1988 |

OTHER PUBLICATIONS

German Examination Report dated Apr. 24, 2020.

*Primary Examiner* — Richard R. Green
*Assistant Examiner* — Madison Elizabeth Dittner
(74) *Attorney, Agent, or Firm* — Greer, Burns & Crain, Ltd.

(57) ABSTRACT

A cargo loading platform for an aircraft, with a plate-like supporting structure, which is configured to support or to receive cargo, and a lifting device. The lifting device is arranged asymmetrically on the plate-like supporting structure and can be moved from a stowage position to a lifting position. In the stowage position, the lifting device is arranged here above a lower side of the plate-like supporting structure and, in the lifting position, is at least partially arranged below the lower side of the plate-like supporting structure. This permits asymmetrical raising of the plate-like supporting structure by the lifting device, as a result of which steps during the transportation of the cargo loading platform can be easily and rapidly overcome. Furthermore, a cargo loading apparatus and a cargo container each with such a cargo loading platform, and also an aircraft with such a cargo loading apparatus are described.

9 Claims, 3 Drawing Sheets

(56) References Cited

U.S. PATENT DOCUMENTS

| | | | |
|---|---|---|---|
| 4,699,337 A | 10/1987 | Lewis | |
| 4,860,973 A * | 8/1989 | Fenner | B64C 1/22 244/137.1 |
| 4,936,733 A | 6/1990 | Girerd | |
| 6,427,947 B1 * | 8/2002 | Rohrlick | B64C 1/22 244/118.1 |
| 9,908,610 B2 * | 3/2018 | Clos | B64D 9/003 |

* cited by examiner

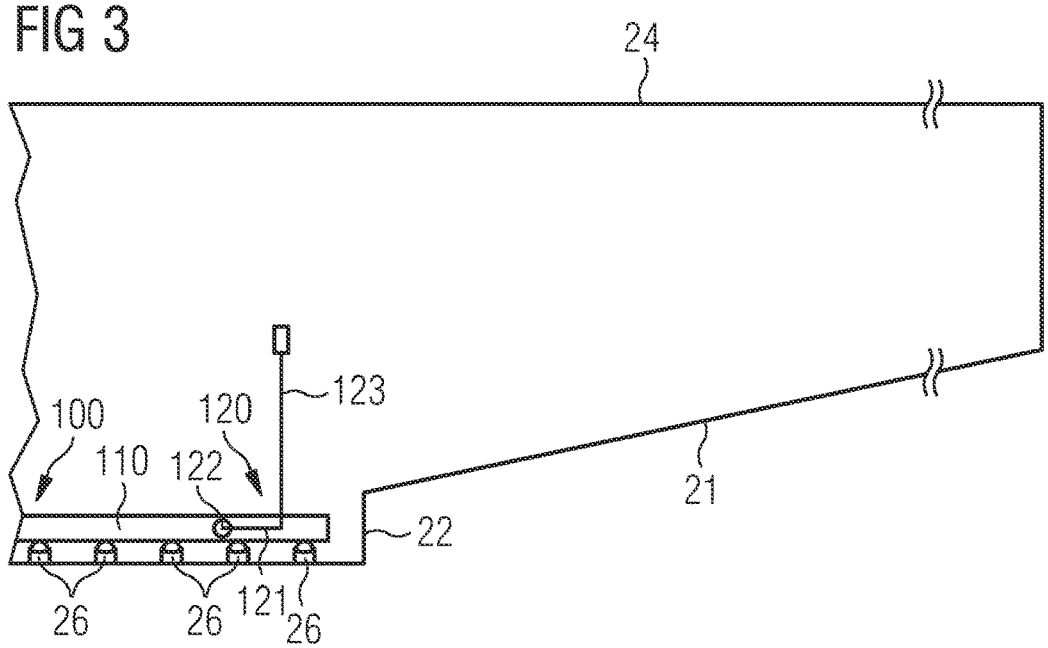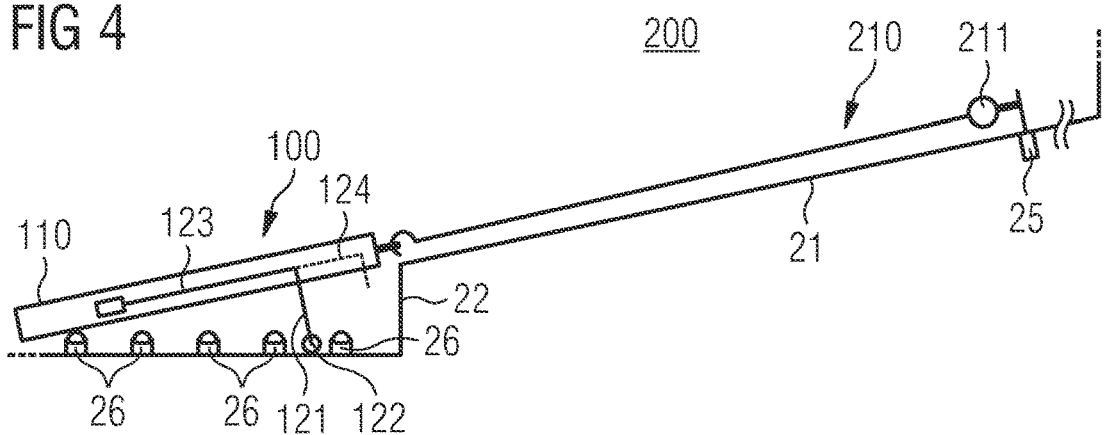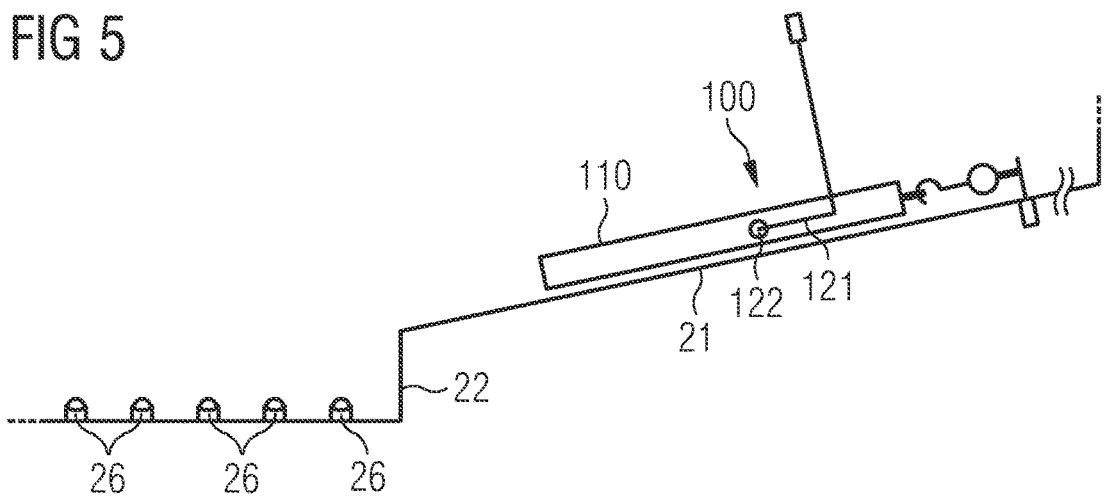

ASYMMETRICALLY RAISABLE CARGO LOADING PLATFORM, AND CARGO LOADING APPARATUS, CARGO CONTAINER AND AIRCRAFT WITH A CARGO LOADING PLATFORM

CROSS-REFERENCES TO RELATED APPLICATIONS

This application claims the benefit of the German patent application No. 10 2018 119 396.3 filed on Aug. 9, 2018, the entire disclosures of which are incorporated herein by way of reference.

FIELD OF THE INVENTION

The invention relates to an asymmetrically raisable cargo loading platform, a cargo loading apparatus, a cargo container and an aircraft with such a cargo loading platform. In particular, the invention relates to a cargo loading platform with a plate-like supporting structure and a lifting device arranged asymmetrically thereon, and also to a cargo loading apparatus and a cargo container with such a cargo loading platform, and furthermore relates to an aircraft with a corresponding cargo loading apparatus.

BACKGROUND OF THE INVENTION

In conventional aircraft, it is attempted to load the existing storage space with cargo and to unload same therefrom as completely as possible and as rapidly as possible. Use is made in this connection of standardized containers which are pushed through a cargo hold door into the storage space and, within the storage space, are positioned for loading and are moved for unloading to the cargo hold door on a roller-based cargo loading system installed in the aircraft. The remaining storage space or regions within the storage space which are not suitable for standardized containers can be loaded with loose cargo which is subsequently secured by nets. In some aircraft, even the entire storage space is loaded with loose cargo.

In the tail region of the aircraft, there is often a storage space region which becomes smaller towards the tail of the aircraft. In particular, the floor of the storage space is inclined and raises towards the tail of the aircraft. A step is generally also arranged between the tail region of the storage space and the remaining storage space. Due to this step and the different heights in this region of the storage space, the latter is either not used at all or is loaded with loose cargo and the latter is secured with nets.

SUMMARY OF THE INVENTION

The invention is based on an object of providing a system with which the storage space of an aircraft cargo hold can be better utilized and, in addition, can be more rapidly loaded and unloaded.

According to a first aspect, a cargo loading platform for an aircraft comprises a plate-like supporting structure, which is configured to store or to receive cargo, and a lifting device, which is arranged asymmetrically on the plate-like supporting structure and is configured to be moved from a stowage position to a lifting position. In the stowage position, the lifting device can be arranged here above a lower side of the plate-like supporting structure and, in the lifting position, can be at least partially arranged below the lower side of the plate-like supporting structure. By means of the asymmetrical arrangement on the plate-like supporting structure, the lifting device is configured to raise the plate-like supporting structure asymmetrically in the lifting position.

By means of the asymmetrical raising of the supporting structure, the cargo loading platform can be raised on one side. This permits simple overcoming of obstacles, such as, for example, a step in a cargo hold floor. For this purpose, the asymmetrically raised cargo loading platform can be pushed with the raised side edge over the step, as a result of which the entire cargo loading platform can be pushed or pulled onto the higher cargo hold floor. By means of the asymmetrical raising of the cargo loading platform, the cargo loading platform, in particular the supporting structure thereof, can also be adapted to an oblique cargo hold floor and can be pushed or pulled rapidly onto the latter.

In a development of the cargo loading platform, the lifting device can have a cantilever element which, in the lifting position of the lifting device, is arranged below the lower side of the plate-like supporting structure. In the lifting position of the lifting device, the cantilever element can protrude from the plate-like supporting structure and therefore forms a foot of the plate-like supporting structure and permits the asymmetrical raising of the cargo loading platform. The cantilever element can be coupled, for example, to the plate-like supporting structure and can be brought into the lifting position by means of a rotational movement. Of course, the cantilever element can reach an end position (the lifting position) in any desired position below the lower side of the plate-like supporting structure. The maximally possible raising of the cargo loading platform is determined here by the length of the cantilever element and a rotation of virtually 90°. For this purpose, the cantilever element is brought into a position in which the cantilever element is arranged approximately perpendicularly to the plate-like supporting structure, but perpendicularly to the cargo hold floor. The cantilever element enables the cargo loading platform to be brought into any desired angle relative to the cargo hold floor up to the maximum possible raised position.

In one variant refinement, the cantilever element can also be a telescopic cantilever element. The telescopic cantilever element is arranged here in its shortest form within the plate-like supporting structure or at least not below the plate-like supporting structure.

In a development of the cargo loading platform, the lifting device can have at least one roller. The roller can be arranged at a free end of the cantilever element remote from the lower side of the plate-like supporting structure in the lifting position of the lifting device. The roller permits movement of the cargo loading platform, in particular in the lifting position of the lifting device. Alternatively, the roller can also be arranged on the lifting device in such a manner that it is at least partially arranged below the lower side of the plate-like supporting structure when the lifting device is in the stowage position. As a result, the roller can also be used to move the cargo loading platform even when the lifting device is in the stowage position.

Alternatively or additionally, the cargo loading platform can furthermore comprise a movement device, which is configured to move the lifting device from the stowage position to the lifting position and from the lifting position to the stowage position. The movement device can be configured here in such a manner that the cantilever element is moved manually. For example, the movement device can be a lever arm which is connected to the cantilever element. The lever arm can be fixedly connected to the cantilever element, and therefore the lifting device can be moved from the stowage position to the lifting position or vice versa.

Alternatively, the lever arm is coupled in an articulated manner to the cantilever element, and therefore the lever arm can likewise take up a stowage position, in particular if the lifting device is in the stowage position.

Likewise alternatively or additionally, the cargo loading platform can have an electric and/or hydraulic drive, which is configured to move the lifting device, in particular by means of the cantilever element, from the stowage position into the lifting position and vice versa. The drive can also be configured in such a manner that it assists a manual movement of the lifting device. For example, the drive cannot move the lifting device independently from the stowage position into the lifting position. Alternatively or additionally, however, the drive can move the lifting device independently from the lifting position into the stowage position since the dead weight of the cargo loading platform contributes here.

In one development, the cargo loading platform can comprise a spring element, which is configured to assist the cantilever element in its rotational movement or telescopic movement. The movement of the lifting device from the stowage position to a lifting position is thereby assisted, irrespective of whether it is a manual movement or a movement assisted/carried out by a drive.

In a further variant refinement, the cargo loading platform comprises a resetting device, which is configured to move the lifting device from the lifting position to the stowage position when the plate-like supporting structure rests on a side edge facing the lifting device. The resetting device can protrude, for example, on the lower side of the plate-like supporting structure such that, when the plate-like supporting structure rests in place (for example, on a raised cargo hold floor), the resetting device is moved into the plate-like supporting structure. By means of a mechanical coupling to the lifting device, the resetting device can at least partially move the lifting device into the stowage position. Alternatively or additionally, the resetting device can also trigger a contact switch by means of which an electric and/or hydraulic drive for moving the lifting device is activated.

According to a further aspect, a cargo loading apparatus comprises a cargo loading platform according to the above aspect, an associated development and/or an associated variant refinement. Furthermore, the cargo loading apparatus can comprise a transport device, which is configured to move the cargo loading platform when the lifting device of the cargo loading platform is in the lifting position. This permits, for example, movement of the cargo loading platform onto a raised section of the cargo hold floor, wherein the step to the raised cargo hold floor is overcome by asymmetrical raising of the cargo loading platform.

The cargo loading apparatus makes it possible to stow cargo in certain regions of a cargo hold of an aircraft without having to undertake changes to the aircraft. The cargo loading platform can thus be accommodated exclusively by components of the cargo loading apparatus in certain sections of a cargo hold of an aircraft without special apparatuses having to be installed thereon.

In one variant refinement, the transport device can comprise a cable winch or cable drum. For example, the cable winch can be configured to be fastened to a lashing point of a vehicle floor (aircraft floor or cargo hold floor). For this purpose, the cable winch can be fastened by means of standardized mountings to a lashing point of the vehicle floor, the lashing point being located, for example, at a remote end of the vehicle floor. Of course, the cable winch can also be arranged or integrated in the cargo loading platform while a cable of the cable winch is fastened to a lashing point of the vehicle floor.

Alternatively or additionally, the transport device can also comprise an electric and/or hydraulic drive, which is configured to move the cargo loading platform on the vehicle floor. For example, for this purpose, the transport device can comprise a rotatably drivable roller, ball and/or belt which rests on the vehicle floor and can thus move the cargo loading platform. The transport device can be arranged here on the cargo loading platform in such a manner that it only touches the floor when the lifting device is in the lifting position.

According to yet another aspect, a cargo container comprises a cargo loading platform according to the first aspect and a self-supporting casing. In other words, the cargo loading platform is integrated in a cargo container. In particular, the cargo loading platform is integrated on the bottom side of the cargo container.

In one variant refinement, the self-supporting casing has a shape which corresponds to a standardized aircraft container. The cargo container can therefore be used as customary in any associated type of aircraft. In addition, the cargo container can also be raised asymmetrically, and therefore it can be moved over a step in the cargo hold floor.

Alternatively, a standard cargo container can also be arranged on the cargo loading platform. Furthermore, the container can be fastened on the cargo loading platform in order to move and to raise the container by means of the cargo loading platform.

Of course, the cargo container or the standard container arranged on a cargo loading platform can also be raised asymmetrically outside the aircraft in order to overcome a step during the transport of the cargo container.

In a development of the cargo container, the self-supporting casing can have two opposite side walls which each have a different height above the plate-like supporting structure of the cargo loading platform. As a result, the cargo container has a roof side (cover) running obliquely with respect to the plate-like supporting structure. If, however, such a cargo container is introduced into a rear region of the cargo hold of an aircraft having a cargo hold floor running obliquely upwards, the existing storage space can be more optimally utilized by the cargo container. In particular if the shorter (less high) side wall is arranged in that region of the cargo hold (storage space) which has a lower height.

According to another aspect, an aircraft comprises a cargo loading apparatus according to the second aspect. The aircraft here can be a conventional aircraft, the cargo hold of which does not have to be adapted for the cargo loading apparatus.

The aspects, developments, refinements and variants that are described here can be combined as desired, and therefore further variant refinements which are not explicitly described are included in the present disclosure.

BRIEF DESCRIPTION OF THE DRAWINGS

Exemplary embodiments of the invention will be described in more detail below with reference to the drawings.

DETAILED DESCRIPTION OF THE PREFERRED EMBODIMENTS

According to the present invention, a cargo loading platform is provided with a plate-like supporting structure and a lifting device for asymmetrically raising the plate-like supporting structure. Furthermore, a cargo loading apparatus and a cargo container each having such a cargo loading platform, and also an aircraft with such a cargo loading apparatus are described.

Figure 1:
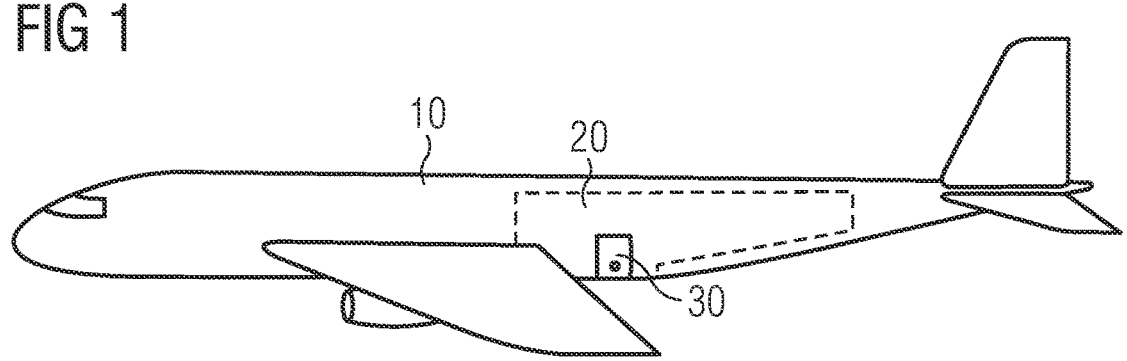
FIG. 1 schematically shows an aircraft with a cargo hold tapering towards the tail region of the aircraft, FIG. 2 schematically shows a longitudinal section through the cargo hold, FIG. 3 schematically shows a longitudinal section through the cargo hold with a cargo loading platform, FIG. 4 schematically shows the cargo loading platform from FIG. 3 in a lifting position, FIG. 5 schematically shows the cargo hold from FIG. 3 with the cargo loading platform stowed, FIG. 6 schematically shows a longitudinal section through a cargo hold with a cargo container according to one variant refinement, and FIG. 7 schematically shows a longitudinal section through a cargo hold with a cargo container according to a further variant refinement.

FIG. 1 schematically shows an aircraft 10 with a cargo hold 20 tapering towards the tail region of the aircraft. For better illustration of the cargo hold 20, and, in particular, of the tapering section, the cargo hold 20 is illustrated over the entire height of the aircraft 10. Of course, the cargo hold 20 may also make up only part of the height of the aircraft 10. For example, the cargo hold 20 can be bounded upward by an intermediate floor (not illustrated) in the aircraft, wherein a passenger cabin (likewise not illustrated) is provided above the intermediate floor.

The cargo hold 20 can be accessible through a cargo hold door 30. A conventional cargo hold door 30 closes an opening in an outer skin of the aircraft 10. As a result, when the cargo hold door 30 is open, cargo loaded in loose form or in containers can be introduced into the cargo hold 20 and stowed there.

Figure 2:
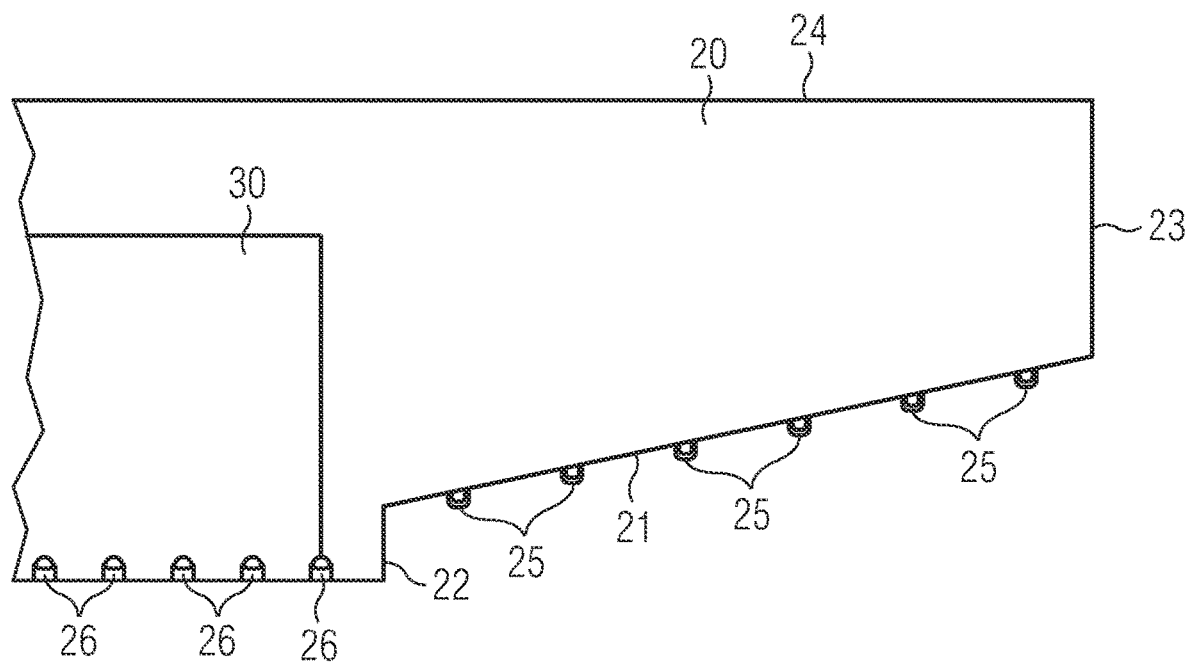

FIG. 2 schematically shows a longitudinal section through the cargo hold 20. In particular, the rear region of the cargo hold 20 is illustrated, and the cargo hold 20 can extend even further to the nose of the aircraft 10 (to the left in FIG. 2). In this region, the cargo hold 20 can have an obliquely arranged floor 21 which is adapted to the tapering tail section of the aircraft 10. Alternatively, the floor 21 can also run horizontally. The floor section 21 can be separated from the rest of the cargo hold 20 by a step 22.

The cargo hold 20 furthermore has a rear wall 23 and a ceiling 24, which bound the cargo hold. The ceiling 24 can run horizontally, for example, in particular if it is formed by an intermediate floor with respect to a passenger cabin. The available storage space thereby decreases towards the rear wall 23. The specific shape of this region of the cargo hold 20 means that only loose cargo is generally accommodated here, the cargo being able to be secured by means of cargo nets (not illustrated in FIG. 2). Lashing points 25 are provided for this purpose. These can be conventional lashing points 25 which are suitable for fastening cargo nets and/or cargo containers in normal cargo holds 20.

The cargo can be introduced into the cargo hold 20 through the cargo hold door 30. For the introduction of cargo containers (not illustrated in FIG. 2), the cargo hold 20 can have a cargo loading system 26, which also includes the lashing points 25. The cargo loading system is conventionally implemented by roller tracks, lashing points and other locking devices.

FIG. 3 schematically shows a longitudinal section through the cargo hold 20 with a cargo loading platform 100, with not all of the details from FIG. 2 having been transferred in order to maintain the clarity of the drawing. The cargo loading platform 100 has a plate-like supporting structure 110, which is configured to store or to receive cargo. For example, loose cargo can be arranged on the cargo loading platform 100 and secured by nets (not shown), wherein the nets are optionally secured on the plate-like supporting structure 110.

Furthermore, the cargo loading platform 100 comprises a lifting device 120, which is arranged asymmetrically on the plate-like supporting structure 110. FIG. 3 illustrates the lifting device 120 in a stowage position. Furthermore, the lifting device 120 which is illustrated comprises a cantilever element 121 with a roller 122 fastened thereto. In particular, the roller 122 is provided at a free end of the cantilever element 121. Furthermore, the cargo loading platform 100 has a movement device 123, which can move the lifting device 120 from a stowage position to a lifting position and back. In a simple refinement, as shown in FIG. 3, the movement device 123 is implemented by a lever arm 123.

FIG. 4 schematically shows the cargo loading platform 100 from FIG. 3 in the lifting position. The lever 123 has been actuated manually here, as a result of which the cantilever element 121 is moved out on a lower side of the plate-like supporting structure 110 and is arranged there. The plate-like supporting structure 110 is thereby raised asymmetrically.

Furthermore, FIG. 4 shows the cargo loading platform 100 as part of a cargo loading apparatus 200, which furthermore comprises a transport device 210. The transport device 210 is configured to move the cargo loading platform 100, in particular when the lifting device 120 is in the lifting position. The transport device 210 which is illustrated can be realized in a simple manner by a cable winch 211. The cable winch 211 can be fastened here to a conventional lashing point 25, preferably the lashing point 25 which lies closest to the rear wall 23. A cable of the cable winch 211 is fastened to the cargo loading platform 100, for example to the plate-like supporting structure 110. In a simple refinement, the cable is suspended on a corresponding opening of the cargo loading platform 100. In a further variant (not illustrated), the cable winch 211 is arranged or integrated in the cargo loading platform 100 and the cable of the cable winch 211 is fastened to a lashing point 25 of the cargo hold floor 21.

FIG. 5 now schematically shows the cargo hold 20 from FIG. 3 with the cargo loading platform 100 stowed. For this purpose, the cable of the cable winch 211 can pull the cargo loading platform 100 onto the obliquely running cargo hold floor 21. The lifting device 120 is configured for this purpose in such a manner that a side edge of the plate-like supporting structure 110 overcomes the step 22 and can be arranged at least flush with the obliquely running cargo hold floor 21.

For easier sliding of the cargo loading platform 100, the plate-like supporting structure 110 can have sliders or rollers (not illustrated separately) on a lower side. Alternatively, a cargo loading system provided in the cargo hold floor 21 can also be used for sliding/rolling the cargo loading platform 100.

When the side edge of the plate-like supporting structure 110 has overcome the step 22 and the plate-like supporting structure 110 comes to lie on the cargo hold floor 21, a resetting device 124 can move the lifting device 120 from the lifting position to the stowage position. The optional resetting device 124 is therefore illustrated merely by dashed lines in FIG. 4. For example, the resetting device 124 can be mechanically displaced by the step 22 and, in the process, can move the lifting device 120 into the stowage position, likewise via a mechanical coupling.

The cargo loading platform 100 arranged on the cargo hold floor 21 and/or (loose) cargo placed on the cargo loading platform 100 can be secured in a conventional manner. For example, use can be made for this purpose of nets and/or lashing straps 27, as is shown by way of example in FIG. 6 for a further refinement with a cargo container. The nets and/or lashing straps 27 can be fastened in a likewise conventional manner to lashing points 25. It is thereby possible to already load the cargo loading platform 100 outside the aircraft with loose cargo, to introduce the loaded cargo loading platform 100 into the cargo hold 20 of the aircraft and to accommodate and to fasten same in that section of the cargo hold 20 having the obliquely running cargo hold floor 21. Valuable time for loading the aircraft can thereby be saved.

Figure 6:
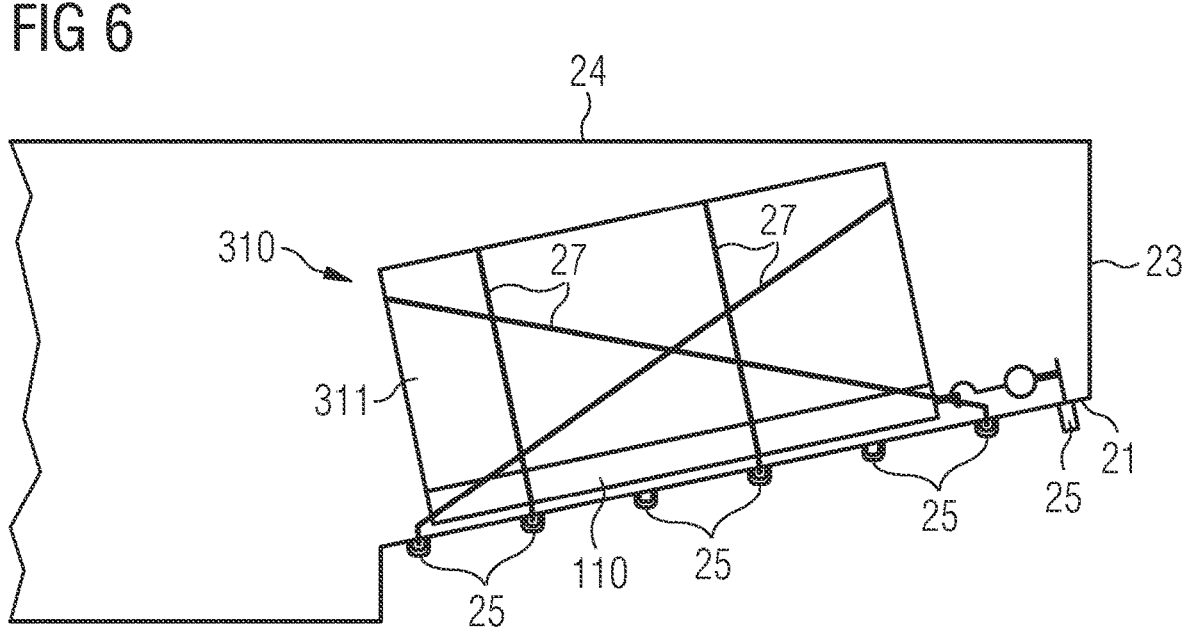

FIG. 6 schematically shows a longitudinal section through a cargo hold 20 with a cargo container 310 according to one variant refinement. The cargo container 310 comprises a cargo loading platform 100 and a self-supporting casing 311. The cargo container 310 has conventional standard dimensions of an aircraft container, for example of an "LD 3" container or "LD 3-46" container. The cargo container 310 can therefore also be accommodated in other regions of the cargo hold 20, but has the advantage of also being able to be used in that section of the cargo hold 20 which is delimited by a step 22 (and has an obliquely running cargo hold floor 21). The cargo container 310 illustrated in FIG. 6 can also be a standard container, which is arranged and fastened on a cargo loading platform 100.

In each case, nets and/or lashing straps 27 can be used for fastening the cargo container 310 in the cargo hold 20 (and also on the cargo loading platform 100 in the case of a standard container). The nets and/or lashing straps 27 can be fastened to lashing points 25 in a likewise conventional manner.

Figure 7:
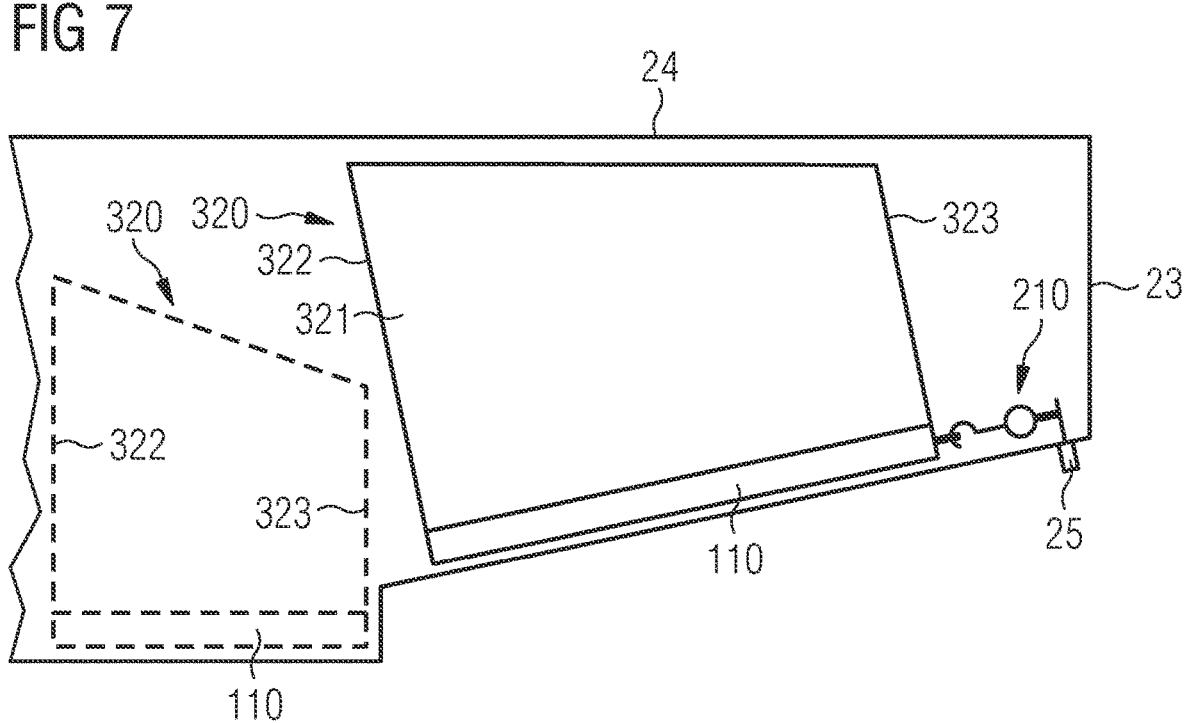

FIG. 7 schematically shows a longitudinal section through a cargo hold 20 with a cargo container 320 according to a further variant refinement. The cargo container 320 does not have standard dimensions, but rather has two opposite side walls 322, 323 which each have a different height above the plate-like supporting structure 110 of the cargo loading platform 100. In FIG. 7, the cargo container 320 is illustrated by dashed lines in a position after being introduced into the cargo hold 20. The side walls 322, 323 of different heights can be seen here. If the cargo container 320 is brought into the section of the cargo hold 20 with an obliquely running cargo hold floor 21 by means of the lifting device 120 and the transport device 210, the shorter side wall 323 lies in the vicinity of the narrowest point of the cargo hold 20, i.e. in the vicinity of the rear wall 23. The higher side wall 322 is correspondingly arranged in the higher region of the cargo hold 20. As a result, the available space in the cargo hold can be better utilized and more cargo can be accommodated in the cargo container 320 and therefore in the aircraft 10.

The above-explained variants, refinements and exemplary embodiments serve merely for describing the claimed teaching, but do not restrict the latter to the variants, refinements and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cargo loading platform for an aircraft, wherein the cargo loading platform comprises:
   a plate-like supporting structure configured to store or to receive cargo; and
   a lifting device arranged asymmetrically on the plate-like supporting structure and configured to be moved from a stowage position to a lifting position,
   wherein, in the stowage position, the lifting device is arranged above a lower side of the plate-like supporting structure and, in the lifting position, is at least partially arranged below the lower side of the plate-like supporting structure,
   wherein the lifting device is configured to asymmetrically raise the plate-like supporting structure in the lifting position, and
   wherein the lifting device has a cantilever element which, in the lifting position of the lifting device, is arranged below the lower side of the plate-like structure, thereby asymmetrically lifting the plate-like structure.

2. The cargo loading platform according to claim 1, wherein the lifting device has a roller, wherein the roller is arranged at a free end of the cantilever element remote from the lower side of the plate-like supporting structure in the lifting position of the lifting device.

3. The cargo loading platform according to claim 1, furthermore comprising:
   a movement device configured to move the lifting device from the stowage position to the lifting position and from the lifting position to the stowage position.

4. The cargo loading platform according to claim 1, furthermore comprising:
   a resetting device configured to move the lifting device from the lifting position to the stowage position when the plate-like supporting structure rests on a side edge facing the lifting device.

5. A cargo loading apparatus, comprising:
   a cargo loading platform according to claim 1; and
   a transport device configured to move the cargo loading platform when the lifting device of the cargo loading platform is in the lifting position.

6. The cargo loading apparatus according to claim 5, wherein the transport device comprises a cable winch, wherein the cable winch is configured to be fastened to a lashing point of a vehicle floor.

7. A cargo container, comprising:
   a cargo loading platform according to claim 1; and
   a self-supporting casing.

8. The cargo container according to claim 7, wherein the self-supporting casing has two opposite side walls which each have a different height above the plate-like supporting structure of the cargo loading platform.

9. An aircraft with the cargo loading apparatus according to claim 5.

* * * * *